United States Patent [19]
Hedstrand et al.

[11] Patent Number: 5,393,797
[45] Date of Patent: Feb. 28, 1995

[54] SMALL CELL FOAMS CONTAINING A MODIFIED DENSE STAR POLYMER OR DENDRIMER AS A NUCLEATING AGENT

[75] Inventors: David M. Hedstrand; Donald A. Tomalia, both of Midland, Mich.

[73] Assignee: The Dow Chemical Company, Midland, Mich.

[21] Appl. No.: 259,205

[22] Filed: Jun. 13, 1994

Related U.S. Application Data

[60] Division of Ser. No. 148,440, Nov. 8, 1993, which is a continuation-in-part of Ser. No. 8,276, Jan. 22, 1993, abandoned.

[51] Int. Cl.$^6$ .......................... C08J 9/00; C08G 6/00
[52] U.S. Cl. ...................... 521/134; 521/79; 521/139; 521/146; 521/149; 521/184; 528/332; 528/363
[58] Field of Search ................ 521/79, 134, 139, 146, 521/149, 184; 528/332, 363

[56] References Cited

U.S. PATENT DOCUMENTS

| | | | |
|---|---|---|---|
| 4,507,466 | 3/1985 | Tomalia et al. | 528/332 |
| 4,558,120 | 12/1985 | Tomalia et al. | 528/363 |
| 4,568,737 | 2/1986 | Tomalia et al. | 528/332 |
| 4,587,329 | 5/1986 | Tonalia et al. | 528/363 |
| 4,694,064 | 9/1987 | Tomalia et al. | 528/332 |

FOREIGN PATENT DOCUMENTS 0271180 6/1988 European Pat. Off. .
9314147 7/1993 WIPO .

OTHER PUBLICATIONS

*Condensed Chemical Dictionary, 7th ed., p. 893 (1966).
*Telechelic Polymers: Synthesis and Applications, Eric Goethels, CRC Press, 1989.
*Advanced Organic Chemistry, 3d ed., (1985) Jerry March.
*Domain Structure and Properties of Block and Graft Copolymers and Polymer Blends, Kyoto University (1979).

*Primary Examiner*—Morton Foelak
*Attorney, Agent, or Firm*—Karen L. Kimble

[57] ABSTRACT

A small cell foam having a modified dense star polymer or dendrimer is described. This modified dense star polymer or dendrimer has a highly branched interior of one monomeric composition and an exterior structure of a different monomeric composition capable of providing a hydrophobic outer shell and a particle diameter of from about 5 to about 1,000 nm with a matrix polymer.

19 Claims, No Drawings

SMALL CELL FOAMS CONTAINING A MODIFIED DENSE STAR POLYMER OR DENDRIMER AS A NUCLEATING AGENT

STATEMENT OF FEDERALLY SPONSORED RESEARCH

This invention was made with U.S. Government support under a subcontract, number 9751405, between The University of California and The Dow Chemical Company. The University of California held the primary contract, number W-7405-ENG-48, which was awarded to The University of California by the U.S. Department of Energy. The U.S. Government has certain rights in this invention.

CROSS-REFERENCE TO RELATED APPLICATION

This is a divisional of application Ser. No. 08/148,440, filed Nov. 8, 1993, now allowed, which is a continuation-in-part of application Ser. No. 08/008,276, filed Jan. 22, 1993, now abandoned.

FIELD OF THE INVENTION

The present invention concerns small cell foams and blends and a process for their preparation. More particularly, the present invention concerns the use of modified dense star polymers as nucleating agents in the production of small cell foams.

BACKGROUND OF THE INVENTION

In order to prepare foams through the use of blowing agents, nucleating agents are necessary to initiate bubbles which are large enough to continue growing, rather than collapse or redissolve. For large cell foams, e.g., those having cell diameters greater than 100 micrometers ($\mu$m), small weight percent loadings of relatively large, insoluble, inorganic particulates, such as talc, frequently serve to initiate the required number of bubbles. However, to prepare a small cell foam (i.e., those foams having cell diameters less than 100 $\mu$m), the number of nucleator particles must be increased in order to increase the number of cells in order for a given final density product to be achieved. The use of conventional nucleating agents is undesirable in forming small cell foams for two reasons: 1) the weight percent loading of nucleator becomes large in order to introduce the necessary number of particles; and 2) the particles are usually too large in their volume and thus fill a large proportion of the cells. These factors prevent in conventional nucleating agents can lead to problems in both (i) the processing of the materials, for example inhomogeneous blending of the nucleator or abrasive action on equipment, and (ii) the properties of the product foam, such as increased density or decreased insulation efficiency.

Smaller nucleators have been formed through the introduction of zinc stearate into the matrix polymer. The micelle-like aggregates formed by the salt function as nucleators, but the range of particle sizes of these nucleators can be quite broad, leading to nonuniform nucleation.

Small cell foams can also be formed by homogeneous nucleation (i.e., non-nucleated) at high pressures. However, this technique is dependent upon random fluctuations within the pressurized polymer matrix, which can be difficult to control and which are easily overwhelmed by fortuitous heterogeneous nucleators (i.e., unintended contaminates). Therefore, new reliable methods that overcome these shortcomings would be most useful.

In recent years, certain polymers, referred to as dense star polymers or dendrimers or as STARBURST TM (a trademark of Dendritech Inc.) polymers, have been developed. Dense star polymers or dendrimers exhibit molecular architecture characterized by regular dendritic branching with radial symmetry. These radially symmetrical molecules are referred to as possessing "starburst topology". These polymers are made in a manner which can provide concentric dendritic tiers around an initiator core. The starburst topology is achieved by the ordered assembly of repeating units, usually organic groups, in concentric, dendritic tiers around an initiator core; this is accomplished by introducing multiplicity and self-replication (within each tier) in a geometrically progressive fashion through a number of molecular generations. The resulting highly functionalized molecules have been termed "dendrimers" in deference to their branched (tree-like) structure as well as their oligomeric nature. Thus, the terms "dense star oligomer" and "dense star dendrimer" are encompassed within the term "dense star polymer". Also topological polymers, with size and shape controlled domains, are dense star dendrimers that are covalently bridged through their reactive terminal groups, which are referred to as "dense star bridged dendrimers." The term "dense star bridged dendrimer" is also encompassed within the term "dense star polymer".

These dense star polymers have been previously described as a solvent soluble, radially symmetrical dense star polymer wherein the dense star polymer has at least one core branch emanating from a core, said branch having at least one terminal group provided that (1) the ratio of terminal groups to the core branches is two or greater, (2) the density of terminal groups per unit volume in the polymer is at least 1.5 times that of an extended conventional star polymer having similar core and monomeric moieties and a comparable molecular weight and number of core branches, each of such branches of the extended conventional star polymer bearing only one terminal group, and (3) the dense star polymer has a molecular volume that is no more than about 60 to 80 percent of the molecular volume of said extended conventional star polymer as determined by dimensional studies using scaled Corey-Pauling molecular models, and has regular dendritic branching. (See, for example, the descriptions of dense star polymers in U.S. Pat. Nos. 4,507,466; 4,558,120; 4,568,737; 4,587,329; and 4,694,064; and European Patent Application Publication No. 0 271 180, the disclosures of which are hereby incorporated by reference.) It has been previously found that the size, shape and properties of these dense star polymers can be molecularly tailored to meet specialized end uses (e.g., European Patent Application Publication No. 0 271 180, the disclosure of which is hereby incorporated by reference.) However, nowhere is the use of such dense star dendrimers as nucleating agents for the production of small cell foams taught or suggested.

SUMMARY OF THE INVENTION

It has now been found that dense star polymers which are modified to have a hydrophobic surface (herein "hydrophobic dense star polymer") can be caused to be compatible enough to disperse in a polymer matrix, yet are different enough to function as effective nucleators during the foaming process. The present invention concerns a process for the preparation of small cell foams which comprises using as nucleating agents modified dense star polymers, which have a highly branched interior of one monomeric composition and an exterior structure of a different monomeric composition capable of providing a hydrophobic outer shell and which have a particle diameter of from about 5 to about 1,000 nanometers (nm) (50 to 10,000 A°), and a matrix polymer, using a physical blowing agent to form the foam. The invention also includes small cell foams comprising a hydrophobic dense star polymer and a matrix polymer. The invention further includes the polymer blends comprising a hydrophobic dense star polymer and a matrix polymer.

The use of individual hydrophobic dense star polymers as nucleators overcomes many of the problems associated with conventional nucleators. Synthesis procedures allow the hydrophobic dense star polymers to be prepared much more uniformly than done customarily by grinding, by precipitation of solids, or by micellar aggregation within solutions. Thus, a nucleator can be designed and constructed that will be effective at or above a given threshold blowing pressure that is usual with physical blowing agents.

DETAILED DESCRIPTION OF THE INVENTION

"Small cell foams" as used for this invention describes foams with an average cell internal diameter size of less than 100 micrometers ($\mu$m) ("pore size"). Such foams are particularly useful as lightweight construction materials having high insulation efficiencies.

The dense star polymers which comprise the highly branched interior structure of the hydrophobic dense star polymers of the present invention are known compounds and can be prepared according to the procedures described, for example, in U.S. Pat. Nos. 4,568,737 and 4,587,329 and in European Patent Application Publication 0 271 180 and WO 93/14147, the disclosures of which are hereby incorporated by reference. Preferred dense star polymers for use as interior structures in the present invention are amine-terminated or hydroxy-terminated dense star dendrimers, such as amine-terminated polyamidoamine dendrimers ("PAMAM"), hydroxy-terminated polyether dendrimers, amine-terminated polyethyleneimine dendrimers ("PEI"), and poly(propylenimine) dendrimer.

The exterior structure of the modified dense star polymers of the present invention which imparts the hydrophobic nature to the outer shell is comprised of hydrophobic groups. The term "hydrophobic groups" means groups lacking an affinity for, repelling, or failing to adsorb or absorb water ["Dictionary of Scientific and Technical Terms", Ed Sybil P Parker, 4th ed., (1989)].

The hydrophobic groups on the surface of the hydrophobic dense star polymer must be soluble in, miscible in or compatible with the matrix polymer used to make the foams, and the interior of the hydrophobic dense star polymer must be substantially less soluble in, miscible in or compatible with the matrix polymer. Preferred hydrophobic groups are hydrocarbon groups of from 4 to 40 carbon atoms inclusive, preferably from 4 to 24. These hydrophobic groups may also contain oxygen, nitrogen or sulfur atoms, e.g. epoxy, hydroxy, ester or ether groups. However, all substituent groups must be sterically compatible with each other.

The term "sterically compatible" is employed to designate substituent groups which are not affected by steric hindrance as this term is defined in "The Condensed Chemical Dictionary", 7th edition, Reinhold Publishing Co., New York page 893 (1966) which definition is as follows: "steric hindrance. A characteristic of molecular structure in which the molecules have a spatial arrangement of their atoms such that a given reaction with another molecule is prevented or retarded in rate." Sterically compatible may be further defined as reacting compounds having substituents whose physical bulk does not require confinement within volumes insufficient for the exercise of their normal behavior as discussed in *Organic Chemistry* of D. J. Cram and G. Hammond, 2nd edition, McGraw-Hill Book Company, New York page 215 (1964).

Such hydrocarbon groups include linear alkyl groups having from 4 to 40 carbon atoms optionally substituted independently with hydroxy, with $C_1$–$C_{10}$ alkyl, with $C_1$–$C_{10}$ alkoxy, with phenyl or phenyl substituted with from 1 to 5 groups of $C_1$–$C_5$ alkyl or $C_1$–$C_5$ alkoxy groups, or with phenoxy or phenoxy substituted with $C_1$–$C_5$ alkyl or $C_1$–$C_5$ alkoxy groups. Examples of such hydrocarbon groups are hexyl, octadecyl, ethylhexyl, tolyldecyl group, anisyldodecyl group, 3-phenoxy-2-hydroxy-1-propyl, (4-methyl)phenoxy-2-hydroxy-1-propyl, (4-methoxy)phenoxy-2-hydroxy-1-propyl, telechelic polymers (which are polymers having a single functional group at their end as described in *Telechelic Polymers:Synthesis and Applications*, ed. Eric Goethels, CRC Press 1989), 2-hydroxyalkyl moieties formed from the opening of epoxy moieties, and alkylation of the hydroxy groups from the 2-hydroxyalkyl moieties to provide the alkoxy groups.

The hydrophobic dense star polymers of the present invention are prepared by capping the dense star polymers which comprise the highly branched interior structure with a hydrophobic tail or a tail that is chemically similar to or which is compatible with the matrix polymer used to make the foam. The capping reaction may be preformed in any conventional manner suitable for the reactive groups present. Some examples of these reactions can be found in *Advanced Organic Chemistry*, 3rd ed., John Wiley & Sons, New York (1985), by Jerry March and U.S. Pat. No. 4,558,120 at column 12.

By way of example, this can be accomplished by reacting the amine-terminated or hydroxy-terminated dense star dendrimers, which serve as the interior structure, with an appropriate hydrocarbon chloride or bromide or with an appropriate $\alpha,\beta$-epoxide. Reactions with either the halides or epoxides are preferably conducted by contacting the amine-terminated or hydroxy-terminated substrates with at least one equivalent of halide or epoxide for each available terminal amine or hydroxy group in the presence of an inert solvent under basic or neutral conditions. The reaction can be conducted under temperatures ranging from 20° C. to about 150° C. Preferred hydrocarbon halides are primary alkyl chlorides and bromides which, when subjected to conditions favoring bimolecular nucleophilic substitution reactions, provide amines and ethers capped with primary hydrocarbon tails. Preferred epoxides are those derived from the epoxidation of terminal olefins which, when subjected to ring opening under basic or neutral conditions, provide predominantly amines and ethers capped with primary hydrocarbon tails substituted with hydroxy groups in the $\beta$-position. Among the most preferred capping materials are, for example, iso-octyl bromide, cetylbromide, lauryl bromide, glycidyl phenyl ether, glycidyl iso-propyl ether, glycidyl t-butyl ether, glycidyl 1-naphthyl ether, glycidyl 4-methoxyphenyl ether, glycidyl 2-methylphenyl ether, 1,2-epoxydecane, 1,2-epoxyoctadecane, 4,4-diphenyl-1-butene oxide and 11,11-diphenyl-1-undecene oxide.

By modifying the composition of the exterior structure, the overall solubility of the dense star polymer can be significantly tailored to fit the particular matrix polymer from which the foam is to be prepared. Dispersion of the hydrophobic dense star polymer or dendrimer nucleators is necessary for uniform foam production. The hydrophobic dense star polymers are especially suitable as the nucleators for the preparation of the foams because of their unique size and their selected, incompatible interior.

To function effectively as a nucleator for the production of small cell foams, the hydrophobic dense star dendrimers should have a particle diameter of from 5 to 1,000 nm, preferably from 5 to 300 nm. For the hydrophobic polyamidoamine dense star dendrimer, the respective generations are about generation 5 and above, preferably from generation 5 to 10. By selection of the monomeric composition of the interior portion, the number of its repetitions and the monomeric composition of the exterior portion, the hydrophobic dense star dendrimers of this invention can be effectively designed of almost any size range. Tenth generation polyamidoamine dense star polymer capped with glycidyl phenyl ether, for example, has an effective particle diameter of about 10 nm, which is effective as a nucleator at 2,000 psi blowing agent.

While not wishing to be bound by theory, it is believed that the advantageous results of the present invention are obtained because of the hydrophobic surface of the dense star polymer, with an incompatible interior surface. When the blowing agent is introduced, the water in the interior is replaced by the blowing agent. Conventional pressures and elevated temperatures used in making foams are employed. However, the temperature must be less than the degradation temperature of the dense star polymer.

The size of nucleator necessary to initiate bubble growth may be calculated by methods known in the art. As a summary of these methods the following comments are provided. The pressure within a spherical bubble is equal to 2 times the surface tension between the blowing agent within the bubble and the matrix material divided by the radius of the bubble. If the potential of the blowing agent exceeds this pressure, more blowing agent will enter the bubble and the bubble will grow. If the potential is below this pressure, blowing agent will be forced from the bubble and the bubble will shrink. For purposes of this invention, the size of the nucleating molecule is determined by these considerations. For example, in a polystyrene matrix with nitrogen at 2,000 psig as blowing agent, a radius of approximately 5 nm may be calculated as the required nucleator size. A hydrophobic generation 10 STARBURST TM PAMAM dendrimer has a radius in excess of 5.5 nm and, thus is large enough to be effective as a nucleator. The same modification of a generation 7 dense star dendrimer gives a particle that is under 4 nm and should not be effective as a nucleator under these same conditions. This principle has been demonstrated by the preparation of blends of hydrophobic dendrimers in polystyrene and in preparing foams under these conditions. The foam from the generation 7 blend showed no difference in cell size or number from a control sample, containing no added nucleator. On the other hand, the foam from the generation 10 blend showed a greater number of cells with smaller sizes.

The foam is prepared by conventional physical blowing agents. Such blowing agents are gases such as nitrogen, carbon dioxide or inert gases such as helium. These blowing agents operate to make the foam by volitalization or vaporization.

This invention is not limited by the pressures, blowing agents, or nucleator sizes stated in the examples. The use of equipment capable of developing higher pressures would make smaller nucleators effective. Larger nucleators would allow the use of lower pressures and blowing agents that vaporize at relatively lower pressures. A lower limit on size of nucleators that are useful in the present invention is imposed by inhomogeneities inherent in the matrix polymer. When these inhomogeneities exceed the nucleator in size and quantity, they will dominate the nucleation process and the added nucleator will have little effect. This is expected to be the case for nucleators smaller than about 5 nm in diameter. There is no upper limit for the size of an effective nucleator; however, the dispersibility may become less efficient at larger sizes, where steric effects may interfere with the required phase behavior. Therefore, an upper limit of 1,000 nm is chosen for the particles.

"Matrix polymers" means polymers that are soluble in, miscible in or compatible with the hydrophobic groups on the surface of the hydrophobic dense star polymer. Examples of suitable matrix polymers used in this invention are thermoplastic polymers, such as polyethylene, polypropylene, polystyrene, polyacrylate, polymethyl methacrylate, and polyisobutylene.

In a typical process, the nucleating hydrophobic dense star polymer is dispersed in the matrix polymer. This is preferably accomplished by dissolving the nucleating agent in the monomer and forming the matrix by subsequent polymerization. Alternatively, the nucleator can be added to the preformed matrix polymer by mechanical mixing. The blend is then pressurized with blowing agent and allowed to expand. In a production environment, the pressurization is usually carried out on a melt in an extruder; upon emerging from the extruder, the pressurized melt expands. In the laboratory, however, it is often more convenient to pressurize molded plaques at room temperature and to subsequently expand the plaques by heating. The upper limit on the heating possible is determined by the degradation temperature of the dense star polymer.

The selection of the hydrophobic groups necessary to effect the homogeneous dispersion of the hydrophobic dense star polymers is known to one skilled of the art. This selection of hydrophobic groups for a given matrix polymer can be understood by analogy to blocked copolymer blends.

The thermodynamics of blends of high molecular weight materials do not have large enough entropy of mixing contributions to stabilize the solutions, unless the polymer components are very close in their surface energy. The stability of the dispersion of one polymer within another is dominated by the interfacial energies between the microscopic domains of the two components. Thus, a blend of the two homopolymers will tend to separate into two distinct phases in order to minimize the interfacial area and total energy of the system.

It is known in the art that a stable blend can be prepared if one of the components is a block copolymer composed of segments with much different solubility parameters. See, for example, *Domain Structure and Properties of Block and Graft Copolymers and Polymer Blends*, pub. Kyoto University (1979), by the Research Staff of Polymer Mechanics Laboratory at the Department of Polymer Chemistry, Faculty of Engineering, Kyoto University. In this case, there is a considerable interfacial energy between the segments of the copolymer, which is relieved when the segments are separated by another component of the blend, preferably one other component. With appropriate choices of homopolymer and copolymer compositions, this internal energy is greater than the interfacial energy between the two polymers and the blend is more stable than the two distinct phases.

While not wishing to be bound by theory, a similar situation is believed to exist in the blends employed in the present invention. Experimental and theoretical studies of the dense star polymers suggest that many of the end groups of the molecules are folded back into the interior of the molecule in order to fill space efficiently. This implies that there is considerable interaction of the modifying groups with the interior groups of the molecule when the material is not blended. This high energy interaction is relieved when the material is in the blends of the present invention. The best choice of compositions to optimize the stability of the blend maximizes the differences between interior and end groups within the dense star polymer and minimizes the interfacial energy between the matrix polymer and the dense star polymer. Thus, the aromatic derivatives as modifications are superior to the aliphatic hydrocarbon derivatives as modifications in blends with polystyrene.

Minimization of interfacial energy is expected to minimize the interface area between the various microphases. This would be achieved by placing all of the copolymer end groups in a spherical shell, or a portion of a spherical shell on the surface of the macromolecular particle. Thus, controlled microphase separation is achieved with groups that are not immediately connected to each other. When the multiplicity of end groups is sufficient to form a continuous spherical shell, this shell serves to form a barrier between the interior of the macromolecule and the matrix polymer in which it is dispersed.

While not wishing to be bound by theory, it is believed that the advantageous results of the present invention in the selection of the hydrophobic groups is the result of an energetically favorable balance of the interfacial energies between the components of the blend. This favorable balance is best exemplified when the volume ratio (v/v) of the exterior groups to the highly branched interior structure is about 1:10 to 10:1, preferably 1:5 to 5:1, more preferably about 1:1.

The following preparative examples are illustrative of the hydrophobic dense star polymers which are useful in the practice of the present invention, which are intended to be purely exemplary of the present invention.

EXAMPLE 1

Glycidyl Phenyl Ether Derivative of Tenth Generation Polyamidoamine Dense Star Polymer A mixture of 0.65 grams (g) of generation 10 dense star polymer derived from ammonia, methyl acrylate and ethylene diamine (which forms PAMAM) and 0.77 g of glycidyl phenyl ether were stirred in 150 milliliters (mL) of ethanol at reflux for 2 days. After cooling the mixture to 0° C., the product (10 g) was isolated as a white foam by filtration and characterized by:

$^{13}$C M (CDCl$_3$), TMS as internal standard ppm 173.2, 159.3, 129.5, 121.2, 114.2, 64–72 (br), 48–60 (br), 32–40 (br).

EXAMPLE 2

4,4-Diphenylbut-1-ene Oxide Derivative of Seventh Generation Polyamidoamine Dense Star Polymer A: 4,4-Diphenylbut-1-ene Oxide To 29 g of benzophenone in 150 mL of tetrahydrofuran (THF) at 0° C. was added 88 mL of 2M allyl magnesium chloride. After 16 hrs, the starting material was completely consumed as indicated by thin layer chromatography (TLC). To the reaction mixture was added 1 mL of methanol to quench the excess Grinard reagent. The THF was distilled in vacuo and the residue was shaken with dilute aqueous hydrochloric acid and chloroform. The layers were separated and the aqueous phase was extracted with chloroform. The combined organic layers were dried with sodium sulfate and concentrated in vacuo to give 37 g of 1,1-diphenyl-3-buten-1-ol which is characterized by:

$^{13}$C NMR (CDCl$_3$), TMS as internal standard ppm 146.6, 133.5, 128.1, 126.0, 125.6, 120.1, 79.6, 46.7; $^1$H NMR (CDCl$_3$) ppm 7.0–7.5 (10H, m), 5.3–5.8 (1H, m), 4.8–5.3 (2H, m), 2.9 (2H, d), 2.5 (1H, s).

The crude product from above, 37 g, was dissolved in 200 mL of THF, a few drops of methanol was added, followed by 5.6 g of sodium hydride added portionwise. The flask was cooled in ice and 18 mL of dimethylsulfate was added over 30 min. The mixture was maintained at 0° C. for 16 hrs, then 5 mL of methanol was added to quench any excess sodium hydride. The solvent was distilled in vacuo and the residue shaken with chloroform and water. Drying the organic phase with sodium sulfate and evaporation gave 50 g of crude product which, after chromatography on silica gel with chloroform as eluent, gave 37.7 g of 4,4-diphenyl-4-methoxybut-1-ene which is characterized by:

$^{13}$C NMR (CDCl$_3$), TMS as internal standard ppm 145.8, 133.3, 127.9, 127.0, 126.7, 117.5, 82.2, 50.1, 40.8; $^1$H NMR (CDCl$_3$) ppm 7.0–7.5 ( 10H, m), 5.3–5.8 ( 1H, m), 4.8–5.3 (2H, m), 3.1 (2H, d), 3.0 (3H, s).

Ammonia, 400 mL, was cooled to −78° C. and 1.15 g of lithium wire was added. After the lithium had dissolved, a solution of 15.5 g of 4,4-diphenyl-4-methoxybut-1-ene in 100 mL of THF was added dropwise, over 1 hr. The mixture was warmed to reflux, then cooled to −78° C. Isoprene, 4 mL, was added to the reaction mixture to quench excess lithium, followed by 4 mL of methanol to quench the diphenylalkyl anion. The mixture was acidified with 9 g of ammonium chloride and the ammonia allowed to evaporate at room temperature. The residue was shaken with chloroform and water. The organic layer was dried and concentrated in vacuo to give 14.3 g of crude residue which, after chromatography on silica gel with chloroform as eluent, gave 13.9 g of 4,4-diphenylbut-1-ene which is characterized by:

$^{13}$C NMR (CDCl$_3$), TMS as internal standard ppm 144.5, 138.7, 128.3, 127.9, 126.1, 116.2, 51.2, 39.9; $^1$H NMR (CDCl$_3$) ppm 7.0–7.3 (10H, m), 5.3–6.0 (1H, m), 4.8–5.3 (2H, m), 3.8–4.2 (1H, t), 2.6–2.9 (2H, t).

To a solution of 0.52 g of 4,4-diphenylbut-1-ene in 25 mL of dichloromethane at 0° C. was added 0.75 g of 50–60% by wt of m-chloroperbenzoic acid. The mixture was stirred at room temperature overnight, then heated at reflux for 1 hr. Water, 1 mL, and 0.25 g of sodium hydrogen sulfite were added to destroy the excess oxidizing agent. The organic layer was washed with water and dilute sodium hydrogen carbonate solution, dried, then concentrated in vacuo to give 0.5 g of 4,4-diphenylbut-1-ene oxide which is characterized by:

$^{13}$C NMR (CDCl$_3$), TMS as internal standard ppm 144.4, 128.5, 127.9, 126.3, 50.9, 48.4, 47.5, 38.6; $^1$H NMR (CDCl$_3$) ppm 7.0–7.3 (10H, m), 3.8–4.2 (1H, t), 2.1–3.0 (SH, m).

B: 4,4-Diphenylbut-1-ene Oxide of Seventh Generation Polyamidoamine Dense Star Polymer To a solution of 0.2 g of generation 7 PAMAM dendrimer in 10 mL of methanol was added 0.36 g of 4,4-diphenylbut-1-ene oxide. Upon heating the solution at 60° C. for 24 hrs, an oily precipitate formed. The mixture was cooled to room temperature and the supernatant solution was decanted. Concentration of the supernatant gave 0.2 g of recovered epoxide. The precipitate was devolatilized to give 0.35 g of the hydrophobic dendrimer product which is characterized by: $^{13}$C M ( CDCl$_3$), TMS as internal standard ppm 145, 144, 128.5, 127.7, 126.3, 47.1, 33–68 (br m).

EXAMPLE 3

4,4-Diphenylbut-1-ene Oxide Derivative of Tenth Generation Polyamidoamine Dense Star Polymer To a solution of 0.2 g of generation 10 PAMAM dendrimer in 10 mL of methanol was added 0.4 g of 4,4-diphenylbut-1-ene oxide (prepared as in Example 2A). Upon heating the solution at 60° C. for 16 hrs, an oily precipitate formed. The mixture was cooled to room temperature and the supernatant solution was decanted. Concentration of the supernatant gave 0.2 g of recovered epoxide. The precipitate was devolatilized to give 0.4 g of the hydrophobic dendrimer product which is characterized by:

$^{13}$C NMR (CDCl$_3$), TMS as internal standard ppm 145.3, 144.3, 128.5, 127.7, 126.4, 47.1, 33–68 (brm).

EXAMPLE 4

11,11-Diphenylundec-1-ene Oxide Derivative of Seventh Generation Polyamidoamine Dense Star Polymer A: 11,11-Diphenylundec-1-ene Oxide To a solution of 10.6 g of ethyl undecylenate in 100 mL of THF at 0° C. was added, over 1 hr, 40 mL of 3M phenyl magnesium bromide. The mixture was warmed to room temperature and stirred for 75 hrs. Methanol, 10 mL, was added to quench the excess Grinard reagent and the solvent was distilled in vacuo. The residue was shaken with diethyl ether and dilute hydrochloric acid. The ether layer was washed with water and saturated sodium hydrogen carbonate, dried, and concentrated in vacuo to give 18.3 g of crude product, which was then chromatographed on silica gel with chloroform as the eluent, to give 13.7 g of 1,1-diphenyl-10-undecen-1-ol which is characterized by:

$^{13}$C NMR ( CDCl$_3$) , TMS as internal standard ppm 147.5, 139.1, 128.0, 126.0, 125.6, 114.1, 79.4, 42.0, 33.8, 30.0, 29.4, 29.3, 29.1, 28.9, 23.7; $^1$H NMR (CDCl$_3$) ppm 7.0–7.5 (10H, m), 5.3–6.2 (1H, m), 4.8–5.3 (2H, m), 1.7–2.5 (SH, m), 1.0–1.5 ( 12H, br s ).

To a mixture of 1.2 g of sodium hydride and 0.1 mL of methanol in 50 mL of THF was added a solution of 10 g of 1,1-diphenyl-10-undecen-1-ol in 20 mL of THF over 2 hrs. The mixture was stirred at room temperature for 4 hrs, then 3.5 mL of dimethylsulfate was added. The mixture was stirred for an additional 75 hrs, then 2 mL of methanol was added to quench any excess sodium hydride. The solvent was distilled in vacuo, the residue taken up in ether, and the solution washed with 10% by wt of hydrochloric acid, water, and saturated sodium hydrogen carbonate. The solution was then dried with sodium sulfate and concentrated in vacuo to give 10.6 g of 11,11-diphenyl-11-methoxyundec-1-ene which is characterized by:

$^{13}$C NMR ( CDCl$_3$) , TMS as internal standard ppm 145.7, 139.1, 127.7, 127.0, 126.4, 114.1, 82.4, 50.0, 35.1, 33.8, 30.0, 29.5, 29.4, 29.1, 28.9, 22.7; $^1$H NMR (CDCl$_3$) ppm 7.0–7.5 (10H, m), 5.3–6.2 (1H, m), 4.8–5.3 (2H, m), 3.0 (3H, s), 1.7–2.5 (4H, m), 1.0–1.5 (12H, br s).

Lithium wire, 0.75 g, was dissolved in 300 mL of ammonia at −78° C. A solution of 10.1 g of 11,11-diphenyl-11-methoxyundec-1-ene in 20 mL of THF to the lithium solution and the mixture was stirred at reflux for 30 min. To a reaction vessel were added sequentially 5 mL isoprene, 5 mL of methanol, and 10 g of ammonium chloride and the ammonia allowed to evaporate at room temperature. Diethyl ether was added to the mixture and the solution was washed with water and brine (saturated aqueous sodium chloride). The organic layer was dried and concentrated in vacuo to give 9.7 g of 11,11-diphenylundec-1-ene which is characterized by:

$^{13}$C NMR (CDCl$_3$), TMS as internal standard ppm 145.4, 139.1, 128.3, 127.9, 126.0, 114.1, 51.4, 35.8, 33.8, 29.6, 29.4 (2x), 29.1, 28.9, 28.0; $^1$H NMR (CDCl$_3$) ppm 7.0–7.3 (10H, m), 5.3–6.2 (1H, m), 4.7–5.2 (2H, m), 3.7–4.0 (1H, t), 1.7–2.4 (4H, m), 1.0–1.5 (12H, br s).

To a solution of 1.53 g of 11,11-diphenylundec-1-ene in 25 mL of dichloromethane was added 1.5 g of 50–60% by wt of m-chloroperbenzoic acid and the mixture was stirred at room temperature for 16 hrs. The solution was diluted with diethyl ether and washed with 10% by wt aqueous solution of sodium hydrogen sulfite, saturated aqueous sodium hydrogen carbonate solution, and brine. The organic layer was dried over sodium sulfate and concentration in vacuo gave 1.5 g of 11,11-diphenylundec-1-ene oxide which is characterized by:

$^{13}$C NMR (CDCl$_3$), TMS as internal standard ppm 145.3, 128.3, 127.8, 126.0, 52.1, 51.3, 48.9, 35.7, 32.5, 29.9, 29.5, 29.4, 29.1, 28.0, 25.9; $^1$H NMR (CDCl$_3$) ppm 7.0–7.3 (10H, m), 3.7–4.0 (1H, t), 2.2–3.0 (3H, m), 1.7–2.2 (4H, m), 1.0–1.5 (12H, br s).

B: 11,11-Diphenylundec-1-ene Oxide of Seventh Generation Polyamidoamine Dense Star Polymer To a solution of 0.2 g of generation 7 PAMAM dendrimer in 10 mL of methanol was added 0.52 g of 11,11-diphenylundec-1-ene oxide. Upon heating the solution at 60° C. for 24 hrs, an oily precipitate formed. The mixture was cooled to room temperature and the supernatant solution was decanted. Concentration of the supernatant gave 0.2 g of recovered epoxide. The precipitate was devolatilized to give 0.5 g of the hydrophobic dendrimer product which is characterized by:

$^{13}$C NMR (CDCl$_3$), TMS as internal standard ppm 145.3, 128.4, 127.8, 126.0, 51.4, 35.8, 29.7, 26.9, 25.9, 33–68 (br m).

EXAMPLE 5

11,11-Diphenylundec-1-ene Oxide Derivative of Tenth Generation Polyamidoamine Dense Star Polymer To a solution of 0.2 g of generation 10 PAMAM dendrimer in 10 mL of methanol was added 0.5 g of 11,11-diphenylundec-1-ene oxide (prepared as in Example 4A). Upon heating the solution at 60° C. for 16 hrs, an oily precipitate formed. The mixture was cooled to room temperature and the supernatant solution was decanted. Concentration of the supernatant gave 0.2 g of recovered epoxide. The precipitate was devolatilized to give 0.5 g of the hydrophobic dendrimer product which is characterized by:

$^{13}C$ NMR (CDCl$_3$), TMS as internal standard ppm 145.3, 128.4, 127.8, 126.0, 51.4, 35.8, 29.7, 26.9, 26.0, 33–68 (br m).

The following examples are illustrative of the process for producing small cell foams using hydrophobic dense star polymers as nucleating agents.

EXAMPLE 6

Preparation of Polystyrene Foam Using Glycidyl Phenyl Ether Modified Tenth and Seventh Generation Polyamidoamine Dense Star Polymer as the Nucleating Agent The hydrophobic dendrimer of Example 1 (0.1 g) was dissolved in 21 g of styrene which contained 0.03 percent divinylbenzene. Azobisisobutyronitrile (0.15 g) was added to the solution and the mixture was sealed in a capped pressure bottle and agitated in an ultrasonic cleaning bath. The mixture was heated at 100° C. for 16 hrs and then at 140° C. for an additional 4 hrs. The clear plug of polymer which formed was removed from the bottle and was ground to a coarse powder in a Waring blender. The powder was compression molded into 1.5×1.5×0.04 inch plaques at 190° C.

The plaques were stored in a pressure vessel under nitrogen pressure (2000 psi) for 16 hrs. The samples were removed from the pressure vessel and immediately heated in an oven at 140° C. for 30 secs to induce foaming. The samples were removed from the oven, allowed to cool, sectioned with a sharp knife, and examined by scanning electron microscopy.

The seventh generation hydrophobic dendrimer of polyamidoamine dense star polymer was made in a manner analogous to the above described procedure and the foams prepared in a similar manner.

Scanning electron microscopy of the foams showed cell diameters of 30–50 mm for the generation 10 containing material and 100–150 mm for the generation 7 containing material.

EXAMPLE 7

Preparation of Polystyrene Foams Using 11,11-Diphenylundec-1-ene Oxide Modified Seventh or Tenth Generation Polyamidoamine Dense Star Polymer as the Nucleating Agent The polymer blend was formed by preparing a solution of hydrophobic dendrimer of Example 5 for tenth generation and Example 4 for seventh generation experiments, respectively, (0.5% by wt), azobisisobutyronitrile (0.7% by wt), and divinylbenzene (0.03% by wt) and polymerization by heating in an oil bath in two steps of 100° C. and 140° C. The resulting polymer samples were ground and compression molded into plaques; and the plaques were pressurized at 2,000 psig of N$_2$ for 16–24 hrs.

The plaques were foamed by heating in an oven at 140° C., at ambient pressure, for 30 secs. Scanning electron microscopy of the foams showed cell diameters of 30–40 mm for the generation 10 containing material and 50–300 mm for the generation 7 containing material. A control sample, prepared in the same manner, but excluding hydrophobic dendrimer, showed cell diameters of 50–300mm.

EXAMPLE 8

Foams from Polystyrene/triphenyl Antimony Containing 11,11-Diphenylundec-1-ene Oxide Modified Dendrimers The polymer blend was formed by preparing a styrene solution of triphenyl antimony (10% by wt), hydrophobic dendrimer from Example 5 for tenth generation and Example 4 for seventh generation experiments, respectively, (0.25% by wt), azobisisobutyronitrile (0.7% by wt), and divinylbenzene (0.03% by wt) and polymerization by heating in an oil bath in two steps of 100° C. and 140° C. The resulting polymer samples were ground and compression molded into plaques; and the plaques were pressurized at 2,000 psig of N$_2$ for 16–24 hrs.

The plaques were foamed by heating in an oven at 150° C., at ambient pressure, for 60 secs Scanning electron microscopy of the foams showed cell diameters of 20–40 mm for the generation 10 containing material and 40–80 mm for the generation 7 containing material.

Plaques were also heated by microwaves in a microwave oven for 8 mins. Scanning electron microscopy of the foams showed cell diameters of 50–200 mm for the generation 10 containing material and 50–400 mm for the generation 7 containing material.

EXAMPLE 9

Foams from Polystyrene/triphenyl Antimony Containing 4,4-Diphenylbut-1-ene Oxide Modified Dendrimers The polymer blend was formed by preparing a styrene solution of triphenyl antimony (10% by wt), hydrophobic dendrimer of Examples 2 and 3 for the seventh and the tenth generations experiments, respectively, (0.25% by wt), azobisisobutyronitrile (0.7% by wt), and divinylbenzene (0.03% by wt) and polymerization by heating in an oil bath in two steps of 100° C. and 140° C. The resulting polymer samples were ground and compression molded into plaques; and the plaques were pressurized at 2,000 psig of N$_2$ for 16–24 hrs.

The plaques were foamed by heating in an oven at 150° C., at ambient pressure, for 60 secs Scanning electron microscopy of the foams showed cell diameters of 50–100 mm for the generation 10 containing material and 50–400 mm for the generation 7 containing material.

Plaques were also heated by microwaves in a microwave oven for 8 mins. Scanning electron microscopy of the foams showed cell diameters of 10–50 mm for the generation 10 containing material and 20–200 mm for the generation 7 containing material.

EXAMPLE 10

Blend of Modified PAMAM Dendrimers with Poly(methyl methacrylate)

A: t-Butyl Glycidyl Ether Modification

To a solution of 0.5 g of generation 7 PAMAM dendrimer was added 0.56 g of t-butyl glycidyl ether (TBGE). The solution was agitated on an orbital mixer for 6 days, then the solvent and excess TBGE were removed by distillation in vacuo, giving 1.0 g of hydrophobic dendrimer which is characterized by:

$^{13}$C NMR (CDCl$_3$), TMS as internal standard ppm 173.0, 27.6, broad peaks 65, 64, 36, 34.

The TBGE hydrophobic dense star polymer described above (0.3 g) was dissolved in 60 g of methyl methacrylate. To this solution was added 0.4 g of azobisisobutyronitrile and the resulting solution was heated at 60° C. for 16 hrs. The resulting polymer was ground and compression molded to give transparent plaques.

B: Epoxyoctane Modification

To a solution of 0.5 g of generation 7 PAMAM dendrimer was added 0.57 g of epoxyoctane. The solution was agitated on an orbital mixer for 6 days, then the solvent and excess epoxyoctane were removed by distillation in vacuo, giving 0.8 g of hydrophobic dendrimer which is characterized by:

$^{13}$C NMR (CDCl$_3$), TMS as internal standard ppm 173.0, 32.0, 29.5, 25.8, 22.6, 14.1 broad peaks 70, 69, 64, 62, 56, 50, 38, 35.

The epoxyoctane hydrophobic dense star polymer described above (0.3 g) was dissolved in 60 g of methyl methacrylate. To this solution was added 0.4 g of azobisisobutyronitrile and the resulting solution was heated at 60° C. for 16 hrs. The resulting polymer was ground and compression molded to give transparent plaques.

EXAMPLE 11

Blend of Modified PAMAM Dendrimer with Styrene/octene Copolymer

The epoxyoctane hydrophobic dense star polymer described in Example 10 (0.1 g) was dissolved in a mixture of 1 g of octene and 19 g of styrene. Azobisisobutyronitrile (0.15 g) was added and the resulting solution was heated at 100° C. for 0.5 day and 130° C. for 1 day to give a solid polymer.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A small cell foam comprising a modified dense star polymer or dendrimer, which has a highly branched interior of one monomeric composition and an exterior structure of a different monomeric composition capable of providing a hydrophobic outer shell and which have a particle diameter of from about 5 to about 1,000 nanometers (nm), and a matrix polymer.

2. The foam of claim 1 wherein the modified dense star polymer or dendrimer is a modified polyamidoamine dense star polymer and the matrix polymer is polystyrene.

3. The foam of claim 1 wherein the modified dense star polymer or dendrimer is a modified polyamidoamine dense star polymer and the matrix polymer is a styrene/octene copolymer.

4. The foam of claim 3 wherein the modified polyamidoamine dense star polymer or dendrimer is the tenth generation.

5. The foam of claim 1 in which the highly branched interior structure of the modified dense star polymer is comprised of an amine-terminated polyamidoamine dendrimer, a hydroxy-terminated polyether dendrimer or an amine-terminated polyethyleneimine dendrimer.

6. The foam of claim 1 in which the hydrophobic outer shell of the modified dense star polymer is comprised of hydrophobic groups of from 4 to 40 carbon atoms inclusive.

7. The foam of claim 6 in which the hydrophobic groups have from 4 to 24 carbon atoms inclusive.

8. The foam of claim 6 in which the hydrophobic groups include linear alkyl groups having from 4 to 40 carbon atoms optionally substituted independently with hydroxy, with $C_1$-$C_{10}$ alkyl, with $C_1$-$C_{10}$ alkoxy, with phenyl or phenyl substituted with from 1 to 5 groups of $C_1$-$C_5$ alkyl or $C_1$-$C_5$ alkoxy groups, or with phenoxy or phenoxy substituted with $C_1$-$C_5$ alkyl or $C_1$-$C_5$ alkoxy groups.

9. The foam of claim 1 wherein the modified dense star polymer or dendrimer is derived from an amine-terminated polyamidoamine dendrimer as its highly branched interior structure.

10. The foam of claim 1 wherein the modified dense star polymer or dendrimer is derived from an hydroxy-terminated polyether dendrimer as its highly branched interior structure.

11. The foam of claim 1 wherein the modified dense star polymer or dendrimer is derived from an amine-terminated polyethyleneimine dendrimer as its highly branched interior structure.

12. The foam of claim 1 wherein the modified dense star polymer or dendrimer is derived from an amine-terminated polypropylenimine dendrimer as its highly branched interior structure.

13. The foam of claim 9 wherein the modified dense star polymer or dendrimer is a seventh generation amine-terminated polyamidoamine dendrimer with 4,4-diphenylbut-1-ene oxide.

14. The foam of claim 9 wherein the modified dense star polymer or dendrimer is a tenth generation amine-terminated polyamidoamine dendrimer with 4,4-diphenylbut-1-ene oxide.

15. The foam of claim 9 wherein the modified dense star polymer or dendrimer is a seventh generation amine-terminated polyamidoamine dendrimer with 11,11-diphenylundec-1-ene oxide.

16. The foam of claim 9 wherein the modified dense star polymer or dendrimer is a tenth generation amine-terminated polyamidoamine dendrimer with 11,11-diphenylundec-1-ene oxide.

17. The foam of claim 1 wherein the foam is a polystyrene foam using glycidyl phenyl ether modified tenth generation polyamidoamine dense star polymer as the modified dense star polymer.

18. The foam of claim 1 wherein the foam is a polystyrene foam using 11,11-diphenylundec-1-ene oxide modified tenth generation polyamidoamine dense star polymer as the modified dense star polymer.

19. The foam of claim 1 wherein the foam is a polystyrene foam using 4,4-diphenylbut-1-ene oxide modified tenth generation polyamidoamine dense star polymer as the modified dense star polymer.

* * * * *